March 22, 1966  H. N. GRILLOT  3,241,479
HAY BALER
Filed March 23, 1964
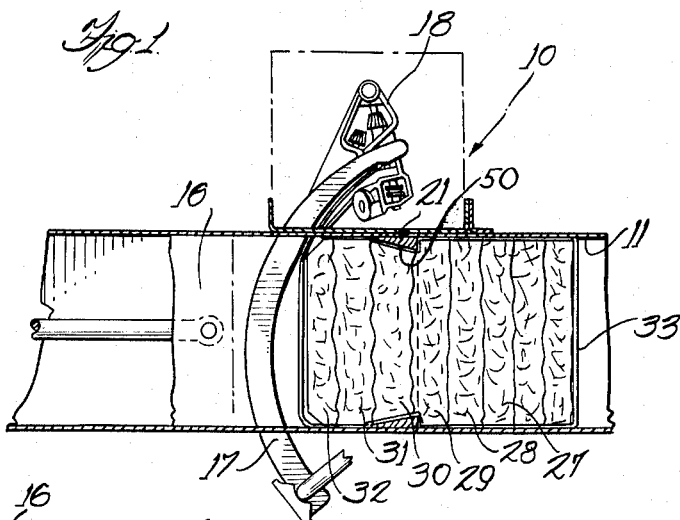
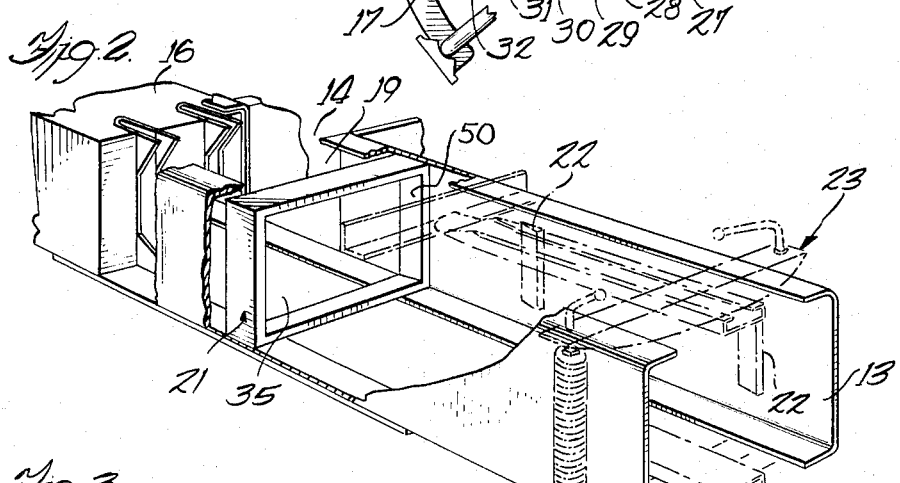
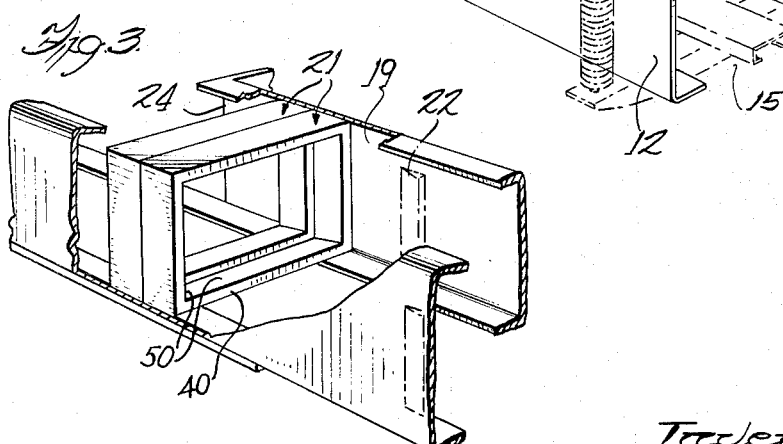
Inventor
Homer N. Grillot
Ralph Alvey
Attorney

United States Patent Office

3,241,479
Patented Mar. 22, 1966

3,241,479
HAY BALER
Homer N. Grillot, Naperville, Ill., assignor to International Harvester Company, Chicago, Ill., a corporation of New Jersey
Filed Mar. 23, 1964, Ser. No. 353,812
5 Claims. (Cl. 100—179)

This patent is a continuation-in-part of U.S. patent application No. 159,241 (now abandoned) filed on December 14, 1961, which filing date is hereby claimed on behalf of this patent.

The inventions disclosed in this and the above prior application are identical and comprise a densifier means for use in the baling chamber of a baler. The densifier means comprises one or a plurality of orifice-like members forming a restriction in a specific region of the baling chamber designated as the "compression zone," that is, the region in which the material being baled is at substantially maximum bale density for the particular operating conditions involved. By imposing an extra force on the material at this point in the baling cycle, the densifier enables the baler to produce a bale of greater density (e.g., a bale from 25 to 50 percent heavier than an ordinary bale of hay). Dense bales are sometimes preferred because they enable a greater weight of material to be stored or shipped in a given space.

The general object of this invention is to provide a baler capable of producing high density bales. Specifically, the objects are: First, to force the material being baled through a restriction when the material is at substantially maximum density (i.e., when the material is in the baler compression zone), so as to effect a greater compacting action. Second, to reduce the resiliency of the material being baled by subjecting it to a flexing action when it is at substantially maximum bale density (i.e., when the material is in the baler compression zone) so as to effect a greater compacting action. Third, to reduce the resiliency of the material by stressing it beyond its elastic limit while it is at substantially maximum bale density (i.e., while the material is in the baler compression zone) so as to effect a greater compacting action. Fourth, to reduce the back pressure on the plunger by restricting breathing or re-expansion of the material while it is at substantially maximum bale density (i.e., when the material is in the baler compression zone) so as to conserve the energy expended by the baler plunger in compacting the material to bale density.

The preferred mode of the present invention is shown in the drawings, where:

FIG. 1 is a cross section of the baling chamber of a plunger-type baler, showing the relative positions of the compression zone, the densifier, the baler plunger, and the binding mechanism;

FIG. 2 is an isometric view of the baling chamber of FIG. 1, showing the densifier;

FIG. 3 is an isometric view of a baling chamber similar to that of FIG. 1, showing a plurality of densifiers installed therein.

While the material densifier disclosed herein is shown as part of the reciprocating plunger-type baler of U.S. Patent No. 2,450,082, it may also be used with other balers, for example, the four bar-type baler of U.S. Patent No. 3,110,246. Likewise, while the densifier herein is used for baling hay it is equally suited for baling other materials.

The baling mechanism 10 of FIG. 1 comprises an elongated baling chamber or material passageway 11 made of channel-shaped sections 12 and 13 (FIG. 2). Material inlet 14 is at the head or upstream end of chamber 11, and bale outlet 15 is at the downstream end. Material entering chamber 11 through inlet 14 is compacted into a bale by reciprocable plunger 16, which forces the material downstream through densifier 21 to outlet 15. A tying mechanism (represented generally by needle 17 and knotter 18 in FIG. 1) binds each bale when completed. The area of baling chamber 11 designated 19 is the "compression zone" and is described in greater detail below because of its critical relationship to the novel densifier 21. Prior art material retainer wedges 22 and a bale chamber tensioning means 23 for controlling bale density are shown (FIG. 2) in chamber 11 downstream of densifier 21 but may be omitted when the densifier is used.

Compression zone 19, that portion of baling chamber 11 (FIGS. 2–3) extending downstream from the rear edge 24 of material inlet 14 for a distance approximately equal to the maximum bale length producible by the baler, is the preferred location for densifier 21 because material in the zone is ordinarily at or near maximum density. Material is packed into baling chamber in individual charges, a "charge" being the increment of material added to a bale by plunger 16 on a single compaction stroke (e.g., each of 27, 28, 29, 30, 31 and 32 in FIG. 1 is a charge). The density of the material in a charge increases as the baler plunger approaches the deadcenter of its compaction stroke. As a charge moves away from the plunger deadcenter position and progresses through the baling chamber, it moves further away from plunger 16, becomes insulated from plunger 16 by subsequent charges and is, therefore, less affected by the compacting action of the plunger. Consequently, as a charge of hay moves through the baling chamber and away from the plunger, it ordinarily tends, within the physical limits available, to re-expand to some degree and decrease in density. Since the bale density producible by densifier 21 is greatest when the density of material entering opening 35 is maximum, material introduced to the densifier should be as dense as possible. It follows, therefore, that compression zone 19, where the material is at maximum density, is the preferred location for densifier 21 and, that within zone 19, densifier 21 should be placed as close as practical to the rear deadcenter position of the compaction stroke of plunger 16. In practice, densifier 21 is located downstream from the rear edge 24 of inlet 14 a distance approximately equal to the thickness of two charges of material (e.g., charges 32 and 31 in FIG. 2).

Densifier 21 (FIGS. 1–2) comprises a rectangular frame having a rectangular opening 35 forming a constriction in the compression zone 19 of the baling chamber 11. Adjoining external sides of densifier 21 are perpendicular to one another and help maintain the rectangularity or "squareness" of bale chamber 11 and, thereby, the parallelism of the bearing surfaces for reciprocating plunger 16. While each of the four sides 50 of opening 35 is a plane surface tapering upstream toward inlet 14, other forms of surfaces can also be used, for example, arcuate surfaces or multiplanar surfaces. The cross-sectional area of opening 35 is less than the cross-sectional area of passageway 11 to either side of densifier 21 and, therefore, acts as a constriction to the flow of material through the compression zone or chamber 11.

The number of densifiers needed to produce a bale of high density (e.g. a bale from 25 to 50 percent heavier than a similar ordinary bale of hay made without densifier 21) varies with the size of the cross-section of the baling chamber 11. In a relatively small bale chamber, one densifier is adequate; whereas a plurality of densifiers is needed for a relatively large bale chamber. When a plurality of densifiers is used (FIG. 3), the action of each duplicate densifier parallels the action of the single densifier of FIGS. 1–2.

There are several theories why densifier 21 produces high density bales. One theory is that in reducing the cross-sectional area of the compression zone of chamber 11, densifier 21 increases the compaction pressure of the hay passing through the opening 35 and, therefore, enables plunger 16 to compact it to a greater density. Thus, in a baler having a 12 by 16 inch baling chamber, a plunger force of 10,000 lbs., but not equipped with a densifier, the hay being baled is theoretically subjected to a compaction pressure of 52.1 p.s.i. If a densifier having a 10 by 14 inch aperture is used, the compaction pressure at the densifier is increased to 71.4 p.s.i., an increase of 37 percent. (These figures are illustrative only, since the densifier dimensions vary with the brand of baler, the plunger force, etc.)

A second theory is that the densifier 21 stresses the hay beyond its elastic limit, thereby reducing its resiliency and making it more susceptible of compaction. This result, an extension of the first theory, depends upon the relative size of the densifier and the properties of the material being baled. All solid materials (hay being one such material) are elastic to a certain extent, that is, are capable of recovering their original shape upon removal of a force or load. When an elastic material is deformed beyond its elastic limit, however, a permanent deformation, set, or loss of resiliency results, so that the material offers less resistance to compaction. Accordingly, hay that has been stressed beyond its elastic limit by the increased pressure produced by passage through opening 35 of densifier 21 is compacted into a denser bale than would otherwise be possible.

A third theory is that densifier 21 produces material fatigue and a loss of resiliency and, thereby, enables the material to be compacted into a denser bale. As hay passes through the throat of densifier 21, it is first flexed inwardly and then, as it passes out of the densifier, it expands outward to the walls of chamber 11. Depending upon the characteristics of the material and the force applied, such flexing can fatigue the material and reduce its resistance to compaction.

Whatever the reason why densifier 21 produces a high density bale, the unique result is undoubtedly attributable to densifier 21 being located in compression zone 19, since prior art retainer plates 22 and prior art bale chamber tensioning device 23 need not be used when the densifier is used. In prior art balers, moreover, retainer plates 22 and bale chamber tensioning device 23 are not capable of producing a high density bale. Retainer plates 22, which may be located at various points in baling chamber 11 including compression zone 19, help some in controlling bale density within conventional limits but mainly prevent reverse flow or "breathing" of the hay during the return stroke of plunger 16. Bale chamber tensioning device 23 imposes a back pressure on all hay upstream of discharge 15 but, in so doing, produces bales of conventional densities only.

The operation of the baler of FIGS. 1–3 is as follows: At the start of a baling cycle, needle 17 is at rest in its home position, having returned there after laying the strand of binding material 33 across baling chamber 11. Loose hay enters baling chamber 11 through inlet 14 and is packed in successive charges (e.g., elements 27, 28, 29, 30, 31 and 32 in FIG. 1) by strokes of plunger 16 reciprocating in chamber 11. The force of plunger 16 against the material is sufficient, if it is hay to stress the material beyond its elastic limit and reduce its resiliency. Initially the charges of material being baled extend to the walls of the baling chamber 11 (e.g., the charges 31 and 32 in FIG. 1). But, as each charge is pushed rearwardly by the following charges and enters densifier 21, it is condensed by the restricted opening 35 of the densifier (e.g. charge 30 in FIG. 1). On reaching the downstream side of densifier 21, each charge re-expands to the walls of the baling chamber but, because of the greater density of the charge, as accounted for by the theories described above, the charge occupies less of the baling chamber (e.g. charge 29 in FIG. 2). When sufficient charges have been packed into chamber 11 to form a bale, the binding mechanism operates to complete the loop of binding material about the bale (FIG. 1) and to tie a knot in the twine.

Since densifier 21 is located as close as possible to the deadcenter position of the compaction stroke of plunger 16, all but one or two charges of hay have passed through opening 35 at the time the binding of the bale is completed. Thus, although some hay is not operated on by densifier 21 until after the binding is completed, the amount of hay involved is relatively small and does not, therefore, introduce any appreciable slack into the binding of the bale.

While only certain modes of the present invention have been disclosed, the invention embraces, as well, all equivalent forms that fall within the spirit and scope of the attached claims.

The invention claimed is:

1. A baler for producing high density bales, said baler comprising: a baling chamber forming an elongated material passageway, a material inlet into said passageway, a bale outlet from said passageway spaced longitudinally along said passageway from said inlet, said passageway having a generally uniform transverse cross section from said inlet to said outlet, compaction means in said passageway for compacting material to bale density, said compaction means having a movable material-engaging surface for moving material toward said bale outlet, said material-engaging surface having a downstream limit of movement in the direction of said bale outlet, a compression zone in said passageway extending longitudinally away from the location of said downstream limit of movement toward said bale outlet, a relatively short densifier means in said passageway within said compression zone for further compaction of said material to a higher density, said densifier means extending around a substantial portion of said passageway and extending transversely, inwardly thereof to form a constriction in said passageway, said densifier means having an opening for the passage of material, the cross section of said opening being smaller than said generally uniform cross section of said material passageway, said opening tapering toward said bale outlet.

2. A baler for producing high density bales, as recited in claim 1, wherein: said transverse cross section of said material passageway is rectangular and said densifier means comprises at least one substantially continuous, rectangular, frame-like member in said passageway, and said opening for the passage of material is a rectangular opening in said frame-like member tapering toward said bale outlet.

3. A baler for producing high density bales, as recited in claim 2, wherein: said rectangular opening in said frame-like member comprises flat surfaces extending longitudinally of said passageway, said flat surfaces sloping inwardly of said passageway towards said bale outlet to form therebetween said tapered opening.

4. A baler for producing high density bales, as recited in claim 3, wherein: the outer perimeter of said rectangular, frame-like member comprises flat surfaces fitting closely to the walls of said pasageway, the adjoining ones of said flat surfaces being perpendicular to one another to maintain said material passageway cross section rectangular.

5. A baler for producing high density bales, as recited in claim 2, wherein: said densifier means comprises a plurality of said rectangular, frame-like members.

References Cited by the Examiner
UNITED STATES PATENTS

| | | | |
|---|---|---|---|
| 208,119 | 9/1878 | Phillips | 100—18 |
| 239,162 | 3/1881 | Groom | 100—183 X |
| 457,636 | 8/1891 | Dederick | 100—187 |
| 751,752 | 2/1904 | Pilliod | 100—187 |
| 2,984,173 | 5/1961 | Roche et al. | 100—93 |

WALTER A. SCHEEL, *Primary Examiner.*

LOUIS O. MAASSEL, *Examiner.*